United States Patent [19]

Ferdinand

[11] 4,165,698
[45] Aug. 28, 1979

[54] STEEL SHELVING

[75] Inventor: Irwin J. Ferdinand, Glencoe, Ill.

[73] Assignee: Hirsh Company, Skokie, Ill.

[21] Appl. No.: 711,527

[22] Filed: Aug. 4, 1976

[51] Int. Cl.$^2$ ............................................. A47B 7/00
[52] U.S. Cl. ...................... 108/156; 29/526 R; 108/111; 151/41.73; 403/282
[58] Field of Search .............. 108/156, 153, 144, 111; 29/432, 522, 526; 151/41.7, 41.73, 41.76; 85/32 K; 403/244, 402, 281, 231, 282, 21, 22; 211/187, 134; 52/758 H

[56] References Cited

U.S. PATENT DOCUMENTS

| 794,127 | 7/1905 | Slayton et al. | 151/44 |
|---|---|---|---|
| 918,665 | 4/1909 | Gingrich | 85/32 K |
| 1,272,919 | 7/1918 | Crawford | 85/32 K |
| 1,571,511 | 2/1924 | Dorsey | 151/44 |
| 1,757,143 | 5/1930 | Renner | 151/41.73 X |
| 1,861,814 | 6/1932 | Peters | 403/281 |
| 2,172,247 | 9/1939 | Kost | 403/21 |
| 2,401,202 | 5/1946 | Tinnerman | 151/41.74 X |
| 2,432,257 | 12/1947 | Stetzer | 151/41.73 X |
| 2,798,770 | 7/1957 | Terrick | 151/54 |
| 3,229,790 | 1/1966 | Shayne | 108/144 |
| 3,283,794 | 11/1966 | Steward et al. | 151/41.75 |
| 3,315,721 | 4/1967 | Koehl | 151/41.74 |
| 3,472,393 | 10/1969 | Vetere | 211/134 |
| 3,572,778 | 3/1971 | Cassel | 29/526 X |
| 3,888,192 | 6/1975 | Basey | 108/111 X |

FOREIGN PATENT DOCUMENTS 671886 10/1964 Italy ............................................. 108/110

Primary Examiner—Roy D. Frazier
Assistant Examiner—Peter A. Aschenbrenner
Attorney, Agent, or Firm—Dressler, Goldsmith, Clement, Gordon & Shore, Ltd.

[57] ABSTRACT

A novel attachment device is provided which can be used to secure two members together, such as a shelf and a support column, with a screw and nut and which does not require the use of a wrench to keep the nut from rotating during tightening of the screw with a screwdriver. A sheet metal shelf has a depending flange with a hole in a deformable region of sheet metal between two parallel vertical slots near the corner of the shelf. A shelf support column has a vertical U-shaped channel with a hole therein. To connect a shelf to a support column, the deformable region of the shelf flange is placed across the opening of the U-shaped channel in the support column with the holes in the flange and support column in alignment and then a screw is inserted therethrough. A nut is threadingly engaged on the screw to bear against one side of the deformable region of the shelf flange and to deform the region into the U-shaped channel of the support column. The nut seats within the deformed region and is prevented from rotating as the screw is tightened.

3 Claims, 7 Drawing Figures

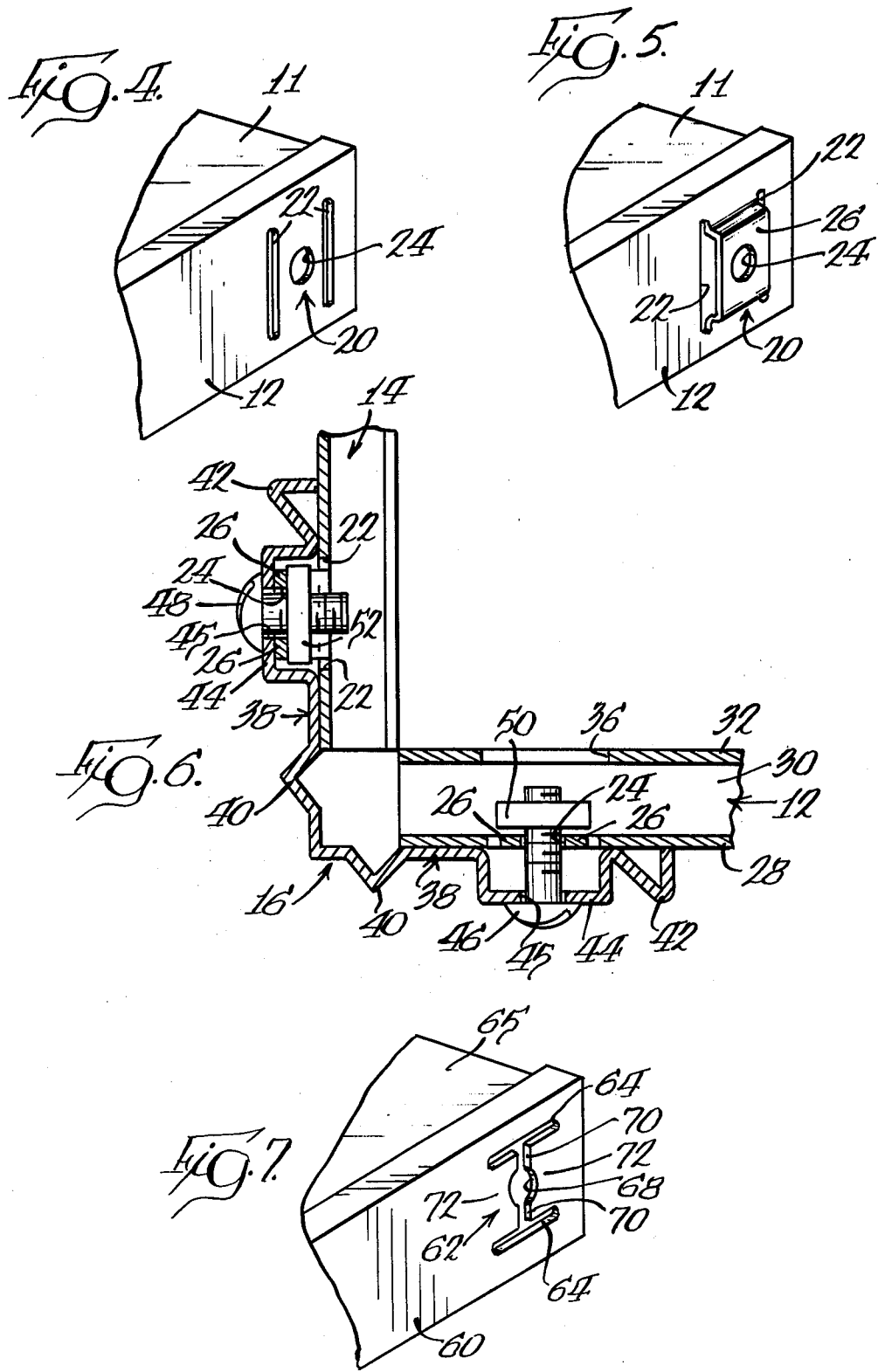

STEEL SHELVING

BACKGROUND OF THE INVENTION

This invention relates in general to modular shelving and, more particularly, to fabricated, lightweight knock-down modular shelving wherein each shelf consists of a flat planar member having integral peripheral opposed side and opposed end flanges extending below the bottom surface of the flat planar member. Such modular shelving systems are usually sold to the customer in a package of disassembled pieces. The assembly is designed and fabricated for ease of customer assembly.

It is known to provide disassembled modular shelving systems. Common forms of such metal modular shelving systems with integral depending peripheral opposed side and opposed end flanges are disclosed in U.S. Pat. No. Re. 27,186 to I. J. Ferdinand et al. assigned to the assignee of the present invention, and in U.S. Pat. No. 3,677,416 to Block et al.

With such a knock-down type shelving assembly, means must be provided for securing the shelf to the support columns and for providing rigid connections at the shelf/support column interface to prevent undue sway of the assembly and to increase shelf-carrying capacity.

In those designs that are intended for customer assembly, the use of complex connections for securing the shelf to the support columns is undesirable. Further, the use of connection means that require the use of many tools or the use of tools other than a screwdriver or similar simple tool, is also undesirable.

The elements comprising the connecting means for securing the shelf to the support columns should further be simple to fabricate and have low manufacturing cost.

SUMMARY OF THE INVENTION

A preferred embodiment of the present invention contemplates a modular shelving assembly consisting of rectangular sheet metal planar shelves having integral opposed side flanges and opposed end flanges. The shelves are mounted on four support columns at adjustable elevations and are secured thereto with a novel connection means or attachment device at each corner.

The shelving assembly can be sold to the consumer in a disassembled, knocked-down state wherein the pieces comprising the shelving assembly are the support columns, the shelves, screws and nuts. Since the thickest of these elements are the support columns, a package containing the knocked-down pieces of a modular shelving system can be made relatively thin.

A novel attachment device is used at each corner to secure the shelf to the support columns. The novel attachment device has four basic parts. The first part consists of a deformable attachment means having a hole located in a deformable region of sheet metal between two parallel vertical slots in the shelf flange near the corner of the shelf. The second part consists of a U-shaped channel having a hole and located in the support column. The third and fourth parts consist of a machine screw and nut, respectively. The shelf and support column are easily secured together by first aligning the holes of the shelf flange and support column and locating the shelf flange adjacent the opening in the U-shaped channel of the support column. Then the machine screw is inserted through the hole in the support column and through the hole in the flange with the head of the screw bearing against the support column. The nut is threadingly engaged on the screw and the screw is tightened. Were it not for the novel deformable attachment means of this invention, the nut would rotate with the screw against the flange as is usual with a nut bearing against a smooth steel surface, thus preventing further threading action from occurring. However, with the novel construction of this invention, the applied threading force causes the nut to first begin to slightly deform the deformable region between the two vertical slots against the U-shaped channel die of the support column. This occurs at a threading force below which the nut would normally start to slip and rotate with the screw. As soon as a slight deformation has occurred, the nut becomes seated within the deformed portion of the flange so that the corners of the outer periphery of the nut engage with undeformed regions of the flange and prevent any rotation of the nut. Therefore, with the nut thus held against rotation, further threading action is possible. As the screw is increasingly tightened, the deformat required during the tightening process to hold the nut from rotating. Further, the joint can be started by a person by merely applying the nut to the machine screw and rotating one or the other to a "finger-tight" threaded engagement. Thereafter, the nut need not be held during the remainder of the tightening of the screw.

It is seen that the assembly of a modular shelving system in accordance with this invention has the advantage of requiring the use of only a screwdriver. Further the deformable region between two vertical slots on the shelf flange and the U-shaped channel die in the vertical support column are both easily fabricated by conventional sheet metal stamping methods.

Numerous other advantages and features of this invention will become readily apparent from the following detailed description of the invention and of one embodiment thereof, from the claims and from the accompanying drawings in which each and every detail is fully and completely disclosed as part of this specification.

BRIEF DESCRIPTION OF THE DRAWINGS

In the accompanying drawings which illustrate embodiments of the present invention.

FIG. 4 is a perspective view of an end of a flange at the corner of the shelf shown in FIG. 2 showing the deformable attachment means in an undeformed state;

FIG. 5 is a perspective view of an end of a flange at the corner of the shelf shown in FIG. 2 showing the deformable attachment in a deformed state;

FIG. 6 is a cross-sectional view of a corner of the shelf with side and end flanges each secured by a screw and nut to and abutting a supporting column; and FIG. 7 is a perspective view of the end of a flange at the corner of a shelf having another embodiment of a deformable attachment means.

DESCRIPTION OF THE PREFERRED EMBODIMENT

Figure 1:
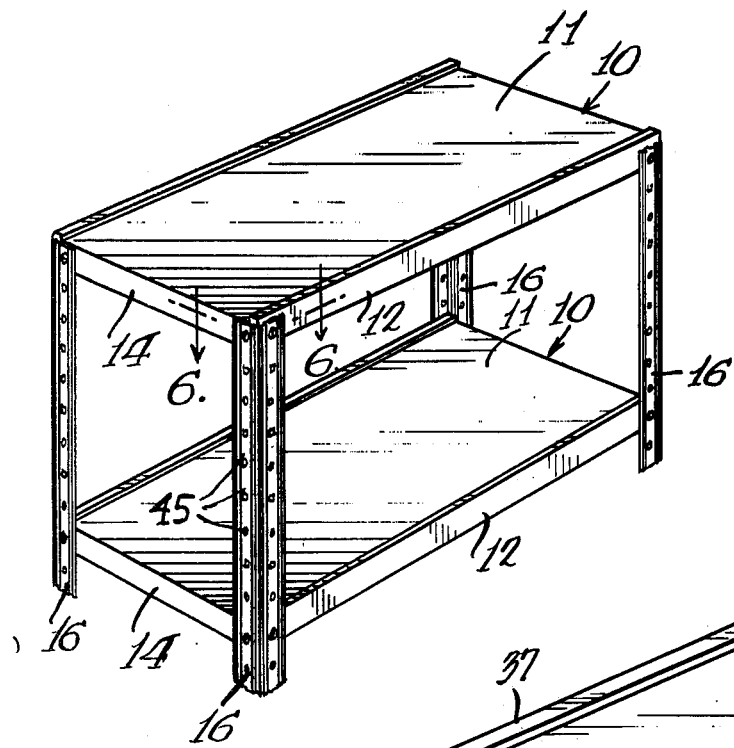
FIG. 1 is a front perspective view of a modular shelf assembly according to the present invention.

While this invention is susceptible of embodiments in many different forms, there is shown in the drawings and will herein be described in detail one specific embodiment and a modification thereof, with the understanding that the present disclosure be considered an exemplification of the principles of the invention and is not limited to the embodiments illustrated. The scope of the invention will be pointed out in the claims.

A modular shelving system according to this invention is shown in FIG. 1. A rectangular shelf 10 has a flat planar portion 11 and two opposed side flange mouldings 12 and two opposed end flange mouldings 14 is mounted between four support columns 16. Each column 16 has two walls forming a right angle and each wall has a vertical array of apertures 45. The shelves 10 are secured through these apertures 45 to the columns 16. The height of the shelves 10 can be varied in accordance with the vertical array of apertures 45 in the support columns 16.

Figure 2:
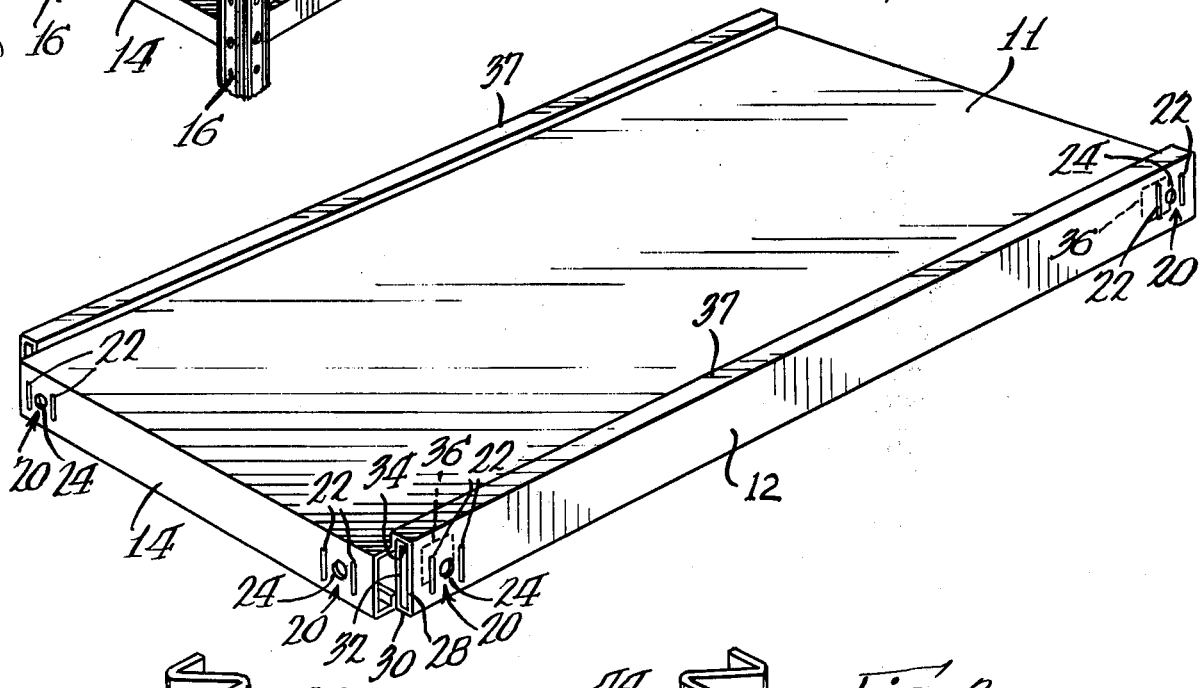
FIG. 2 is a perspective view of a shelf of FIG. 1.

FIG. 2 shows a flat shelf 10 with deformable attachment means 20 located in each flange near the corner of the shelf 10. The shelf 10 can be made from any suitable material such as wood, metal, or plastic, except that the deformable attachment means 20 must be made from a suitably deformable material, preferably sheet metal which can be relatively easily elastically and plastically deformed.

The deformable attachment means at each shelf corner is designed to deform outwardly from the plane of the flange (side flange 12 or end flange 14). This is illustrated in FIGS. 4 and 5 wherein the undeformed state of the attachment means 20 is shown in FIG. 4 and the deformed state of the attachment means 20 is shown in FIG. 5. As illustrated in FIG. 4, the deformable attachment means 20 includes, and is defined by, two spaced parallel slots 22 oriented vertically in the flange 12 about an aperture, or circular hole, 24. The slots 22 are substantially perpendicular to the planar shelf portion 11. As illustrated in FIG. 5, a portion of the deformable attachment means 20, specifically, a deformable region 26 lying between the two flaps 22, can be deformed outwardly from the plane of the side flange 12. The attachment means 20 on the end flanges 14 are identical to the attachment means 20 on the side flanges 12 and function in the same manner.

In the preferred embodiment, the side flanges 12 of a long shelf are formed differently than the end flanges 14. As illustrated in FIG. 2, the side flange 12 consists of four walls: a front wall 28, a bottom wall 30, a back wall 32, and a top wall 34. These four walls form a rectangular cross-section and provide a box-like structure which reinforces and strengthens flange 12. A square cut-out aperture 36 is provided in back wall 32 behind each aperture 24 to accommodate a nut as will hereinafter be described. End flange 14, being much shorter than side flange 12, does not require, and therefore does not have, a box-like reinforcing wall structure. To provide additional reinforcing and to provide a curb for retaining articles upon the shelf planar portion 11, a shoulder 37 is provided at the top of each side flange 12.

Figure 3:
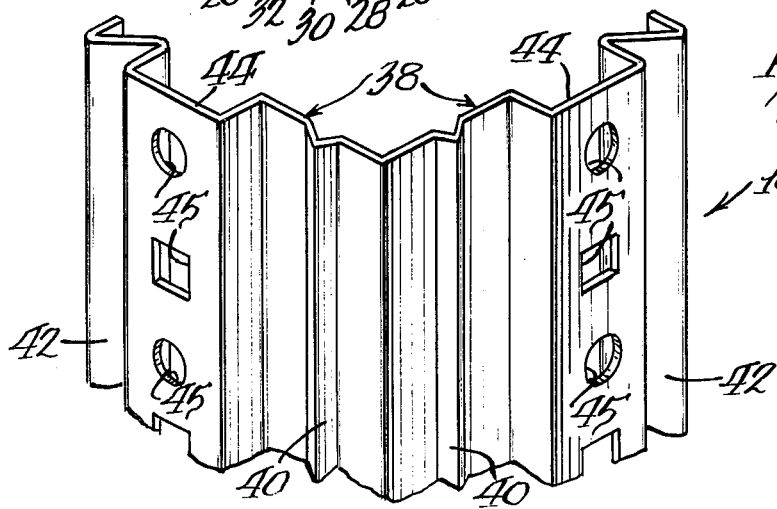
FIG. 3 is a perspective view of an end of a vertical support column of FIG. 1.

As illustrated in FIG. 3, vertical support column 16 has the general shape of a structural angle member and consists of two substantially equal width walls 38 of identical cross-section. Each wall 38 has an inner reinforcing rib 40 and an outer reinforcing rib 42. Between the two ribs is a substantially U-shaped channel 44 which functions as a die means as will hereinafter be explained and which has a plurality of vertically spaced apertures 45 therethrough. As shown, some apertures 45 are square and others are circular. The channel 44 need not necessarily be U-shaped but could be one of a number of other types of recesses in the plane of wall 38.

The novel attachment device of the present invention is used to easily secure the shelf 10 to the support column 16 with appropriate screws and nuts. With reference to FIG. 6, the shelf 10 and a support column 16 are easily secured together by first aligning the apertures or holes of the shelf flange and support column and locating the shelf flange adjacent the opening in the U-shaped channel 44 of the support column 16. The outer surfaces of end flanges 14 and side flanges 12 are brought into abutting contact with walls 38 of the support column 16. A drive piece, such as machine screw 46 is inserted through the aperture or hole 45 in the channel 44 of the support column 16 and through the hole 24 in the side flange 12. Similarly, a screw 48 is inserted through hole 45 of the other wall 38 and through hole 24 of the end flange 14.

Considering first the side flange 12 as illustrated in FIG. 6, the attachment to the support column 16 is effected by applying a jam piece or nut 50 to the screw 46 through cut-out aperture 36 in the back wall 32 of flange 12. The nut 50 is threadingly engaged on the screw 46 in the normal manner by effecting relative rotation between the nut 50 and the screw 46. When the nut 50 has been threaded onto the screw 46 until it is finger tight against the back surface of the front wall 28 of the side flange 12, further tightening of the threaded engagement can be undertaken in the usual manner by applying a screwdriver to the head of screw 46. As the screw is increasingly threadingly tightened, were it not for the novel deformable attachment means of the present invention, the nut 50 would rotate with the screw 46 against the back surface of the front wall 28 as is usual with the threading process involving a screw and nut against a smooth surface. This action, if permitted, would prevent further threading of the nut 50 on the screw 46. However, with the novel construction of this invention, the applied threading force causes the nut 50 to bear against the back surface of the deformable region 26 between the two vertical slots 22. This force slightly deforms the deformable region 26 outwardly as illustrated in FIG. 5. This slight deformation occurs at a threading force below which the nut 50 would normally start to slip against the back surface of deformable region 26 and rotate with the screw 46. As soon as a slight deformation has occurred, the nut 50 becomes seated within the deformed portion of region 26 so that the corners of the outer periphery of the nut 50 engage with the undeformed region or portion of the flange (such as against the sides of slots 22) and prevent any further rotation of the nut 50. Therefore, with the nut thus held against rotation, further threading action is possible. As the screw 46 is increasingly tightened, the deformable region 26 further deforms into the U-shaped channel or die 44 of the support column 16. This increases the area of engagement between the periphery of the nut 50 and the non-deformed portion of the flange. When the deformable region 26 of the flange 12 has deformed enough to seat in the end, or bottom, of the U-shaped die channel 44, the joint is complete. A complete joint is shown in FIG. 6 on flange 14 wherein screw 48 has been threadingly engaged with nut 52.

Another embodiment of the present invention is illustrated in FIG. 7 wherein a flange 60 presents a deformable attachment means 62 defined by, and including, two horizontal slots 64 which run parallel to the shelf planar portion 65. Disposed between the two slots 64 is an aperture or hole 68 which is connected with slots 64 by vertical slots 70. Thus, two easily deformable regions 72 are formed between horizontal slots 64 on either side of vertical slots 70. Deformable regions 72 function analogously to the deformable region 26 described above in FIGS. 4–6 for the preferred embodiment. That is, the deformable region 72, when engaged on one side by a nut, will deform into a recess or channel in the support column to provide a seat in which the nut will be restrained from rotating.

It is seen that a wrench is not required during the tightening process to hold the nut from rotating. Further, the joint can be started by a person by merely applying the nut to the machine screw and rotating one or the other to a "finger-tight" threaded engagement. Thereafter, the nut need not be held during the tightening of the screw. Thus, the assembly of a modular shelving system having an attachment device in accordance with this invention has the advantage of requiring the use of only a screwdriver. Further, the connection formed by the attachment device of this invention is rigid and is locked against rotation about the screw. This is an improvement over many conventional nondeformable attachment devices which do not positively lock against rotation.

It should be noted that the attachment device is relatively simple to manufacture since the deformable region between the two vertical slots on the shelf flange and the U-shaped channel die in the vertical support column are both easily fabricated by conventional sheet metal stamping methods.

The attachment device of the present invention is not restricted to use with shelving assemblies but may be used with any two members that are to be joined together so long as one member has a deformable region and aperture and the other member has a corresponding aperture and die means (such as a concave structure) for receiving and engaging a portion of the deformable region of the first member. Further, the attachment device of the present invention does not necessarily require the use of a machine screw and nut. It is required merely that a drive piece (such as a bolt) and a jam piece (such as a nut) be mutually threadingly engaged to interconnect two members lying therebetween. The jam piece need have only a shape that presents edges or surfaces which can jam against, or abut against, undeformed, or less deformed, regions in the vicinity of the deformable region of one of the members. To effect a joint or connection with such an attachment device, the two members to be connected are placed in abutting adjacent relationship with each other with their apertures in alignment. The drive piece is inserted through the holes with a portion of the drive piece adjacent and abutting a surface of the member having the die means. The jam piece is threadingly engaged on the end of the drive piece and brought into finger-tight threading engagement against a surface of the member having the deformable region. Then, further threading rotation of the drive piece will cause the jam piece to bear against the deformable region and deform the deformable region into the die means whereby the jam piece will be prevented from rotation.

From the foregoing, it will be observed that numerous variations and modifications may be effected without departing from the true spirit and scope of the novel concept of the invention. It is, of course, intended to cover by the appended claims all such modifications as follows in the scope of the claims.

What is claimed is:

1. A metal shelving assembly comprising:

at least one shelf; vertical support columns; and securing means for securing said shelf rigidly to said support columns, said shelf having a planar portion and having depending sheet metal flanges, at least some of said flanges having a deformable attachment portion with a flange aperture extending therethrough, each of said vertical support columns having at least one wall including die means for receiving and being engaged by said deformable attachment portion, said die means including a vertical U-shaped channel having a plurality of vertically spaced column apertures therethrough, said deformable attachment portion including two spaced parallel slots in each said flange on either side of one said flange aperture, said slots being substantially perpendicular to said shelf planar portion and substantially parallel to at least one wall of said channel in said support column, each said securing means comprising a jam piece and a drive piece mutually threadingly engaged and interconnecting one of said support columns with said shelf flange deformable attachment portion through said flange and column apertures whereby, when said jam piece and said drive piece are threadingly tightened to interconnect said support column with said deformable attachment portion, said deformable attachment portion is drawn to engage said die means and to deform therein, thereby preventing said jam piece from rotating.

2. A shelf comprising a planar portion and depending sheet metal flanges, at least some of said flanges having a deformable attachment portion with an aperture for securing said shelf to vertical support columns with securing means, said deformable attachment portion defined by two spaced parallel slots in said flange on either side of said flange aperture, said vertical support columns having at least one wall including die means for receiving and being engaged by said deformable attachment portion and having associated with said die means a column aperture extending therethrough, said die means comprising a channel in one of said support column walls providing a recess surrounding each said column aperture in said one wall of said support columns, each said slot in said flange being substantially perpendicular to said shelf planar portion and parallel to at least one wall of said channel in said support column, each said securing means comprising a jam piece and a drive piece mutually threadingly engaged and interconnecting one of said support columns with said shelf flange deformable attachment portion through said flange and column apertures whereby, when said jam piece and said drive piece are threadingly tightened to interconnect said support column with said deformable attachment portion, said deformable attachment portion is drawn to engage said die means and to deform therein, thereby preventing said jam piece from rotating.

3. A shelf in accordance with claim 2 in which said shelf is rectangular and said support columns have two substantially equal width walls of identical cross-section.

* * * * *

UNITED STATES PATENT AND TRADEMARK OFFICE
CERTIFICATE OF CORRECTION

PATENT NO. : 4,165,698
DATED : August 28, 1979
INVENTOR(S) : Irwin J. Ferdinand

It is certified that error appears in the above-identified patent and that said Letters Patent are hereby corrected as shown below:

Column 2, line 21, after "the" cancel "deformat" and insert --deformable region of the flange further deforms into the U-shaped channel die of the support column. This increases the area of engagement between the periphery of the nut and the non-deformed portion of the flange. When the deformable region of the flange has deformed far enough to seat in the end, or bottom, of the U-shaped channel die in the support member, the joint is complete. Thus, it is seen that a wrench is not--

Signed and Sealed this

Thirteenth Day of November 1979

[SEAL]

Attest:

RUTH C. MASON
Attesting Officer

LUTRELLE F. PARKER
Acting Commissioner of Patents and Trademarks